(12) United States Patent
Yun et al.

(10) Patent No.: US 6,413,342 B1
(45) Date of Patent: Jul. 2, 2002

(54) METHOD OF FORMING A BEAD WITH AN ANCHORED TRAILING END

(75) Inventors: Seung-Taek Yun; Alexander Angus Edward Campbell, both of Kingston (CA)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/504,415

(22) Filed: Feb. 15, 2000

(51) Int. Cl.⁷ ............................................. B29D 30/48
(52) U.S. Cl. ..................... 156/136; 152/540; 156/422; 245/1.5
(58) Field of Search ................. 156/136, 422; 152/540; 245/1.5; 140/88

(56) References Cited

U.S. PATENT DOCUMENTS

| | | | |
|---|---|---|---|
| 3,372,894 A | 3/1968 | Pearce | 245/1.5 |
| 4,321,957 A | 3/1982 | Hahn et al. | 152/362 R |
| 4,806,196 A * | 2/1989 | Smith et al. | 156/422 |
| 4,820,563 A | 4/1989 | Rausch | 428/35.8 |
| 4,938,437 A | 7/1990 | Rausch | 245/1.5 |
| 5,567,269 A * | 10/1996 | Golightly | 156/422 |
| 5,603,799 A | 2/1997 | Kolb et al. | 156/422 |
| 5,820,717 A | 10/1998 | Siegenthaler | 156/136 |
| 5,882,458 A | 3/1999 | Kolb et al. | 156/136 |

FOREIGN PATENT DOCUMENTS

DE          3613349 A1 * 10/1987 ................. 245/1.5

* cited by examiner

Primary Examiner—Geoffrey L. Knable
(74) Attorney, Agent, or Firm—David E. Wheeler

(57) ABSTRACT

The method of forming a bead 10 having a trailing end 12 of at least one bead wire 14 being anchored in the bead 10. The method including the steps of (i) securing a leading end of the bead wire 14; (ii) winding the bead wire 14 about a former 42 a plurality of revolutions to form the bead 10 into a desired cross-sectional shape; and (iii) cutting the bead wire 14 after a last revolution 28 about the former 42. The method being characterized by (iv) anchoring the trailing end 12 of the bead wire 14 by driving it into the bead 10. The driving of the trailing end 12 forces the trailing end 12 between at least two previously wound, abutting revolutions of the bead wire 14, at least temporarily separating the respective revolutions.

4 Claims, 5 Drawing Sheets

METHOD OF FORMING A BEAD WITH AN ANCHORED TRAILING END

TECHNICAL FIELD

This invention relates to a method of forming a bead for a pneumatic tire and, more particularly, to a method of forming a bead where the trailing end of at least one bead wire is anchored in the bead.

BACKGROUND ART

The beads of a pneumatic tire are composed of high tensile steel wire formed into inextensible hoops. The bead functions to anchor the plies of the tire and to hold the tire to the rim of a wheel.

In the manufacture of a tire bead, the bead wire is generally coated with rubber. A leading end of the rubber coated bead wire is secured by a gripping mechanism which is part of a collapsible, ratable bead former. The former is rotated and the rubber coated bead wire is wound around the former a plurality of revolutions. The rubber coating on the wire is uncured so that each revolution of wire adheres to the previously wound revolutions. When the desired cross-sectional shape of the bead is formed, the bead wire is cut to form a trailing end. The trailing end is adhered to the previous revolutions, the former is collapsed, and the bead is removed from the former.

When the bead is built into a pneumatic tire, spring back of the bead wire can occur. During the curing process, the rubber surrounding the bead wire liquefies, reducing its adhesiveness. As the adhesiveness of the rubber is reduced, the bead wire may attempt to spring back to its original shape. This spring back causes the trading end of the bead wire to pull away from the rest of the bead and protrude radially outwardly into the tire. One technique for preventing spring back of the trailing end 12 of the bead wire 14 is to wrap the bead 10, shown in FIG. 1 and FIG. 2. After forming the bead 10, it is placed on a separate machine and is wrapped with a plurality of nylon cords 30, or a like substitute, at intervals around its circumference. The cords 30 keep the trailing end 12 of the bead wire 14 in place during the curing process. Although wrapping the bead 10 eliminates spring back of the trailing end 12 of the bead wire 14, the wrapping process increases labor and material costs associated with the manufacture of beads 10.

Another technique for preventing spring back of the trailing end of the bead wire is to anchor the trailing end within the body of the bead. U.S. Pat. No. 4,938,437 provides a method of manufacturing rubberless single wire tire bead assemblies having at least one end positioned internal to the array of wires comprising the body of the tire bead assembly. This method places all the revolutions of the bead wire on a special former having movable parts and uses the moveable parts to slide the respective revolutions of bead wire into a position surrounding the wire end. This method is limited to rubberless bead wires so the adhesive forces of the uncured rubber coating is not a factor in performing the method.

SUMMARY OF THE INVENTION

This invention provides a method of forming a bead 10 where the trailing end 12 of at least one bead wire 14 is anchored in the bead 10. The method including the steps of: securing a leading end of the bead wire 14; winding the bead wire 14 about a former 42 a plurality of revolutions to form the bead 10 into the desired cross-sectional shape; and cutting the bead wire 14 after a last revolution 28 about the former 42.

The method is characterized by the step of: anchoring the trailing end 12 of the bead wire 14 by driving the trailing end 12 into the bead 10. The driving of the trailing end 12 forces the trailing end 12 between at least two previously wound, abutting revolutions of the bead wire 14, at least temporarily separating the respective revolutions.

The method of this invention can be performed using either a rubberless or a rubber coated bead wire.

Definitions

For ease of understanding this disclosure, the following terms are disclosed. "Bead" means that part of the tire comprising an annular tensile member wrapped by ply cords and shaped, with or without other reinforcement elements such as flippers, chippers, apexes, toe guards, and chafers, to fit the design rim. The beads are associated with holding the tire to the wheel rum so that the driving and baking forces are transmitted from the vehicle to the ground. "Pneumatic tire" means a laminated mechanical device of generally toroiddal shape, usually an open torus, having beads and a tread and made of rubber, chemicals, fabric and steel or other materials. When mounted on the wheel of a motor vehicle, the tire through its tread provides traction and contains the fluid that sustains the vehicle load. "Radial" and "radially" are used to mean directions toward or away from the axis of rotation of the tire.

BRIEF DESCRIPTION OF DRAWINGS

The invention will be described by way of example and with reference to the accompanying drawings in which.

DETAILED DESCRIPTION OF THE INVENTION

Figure 1:
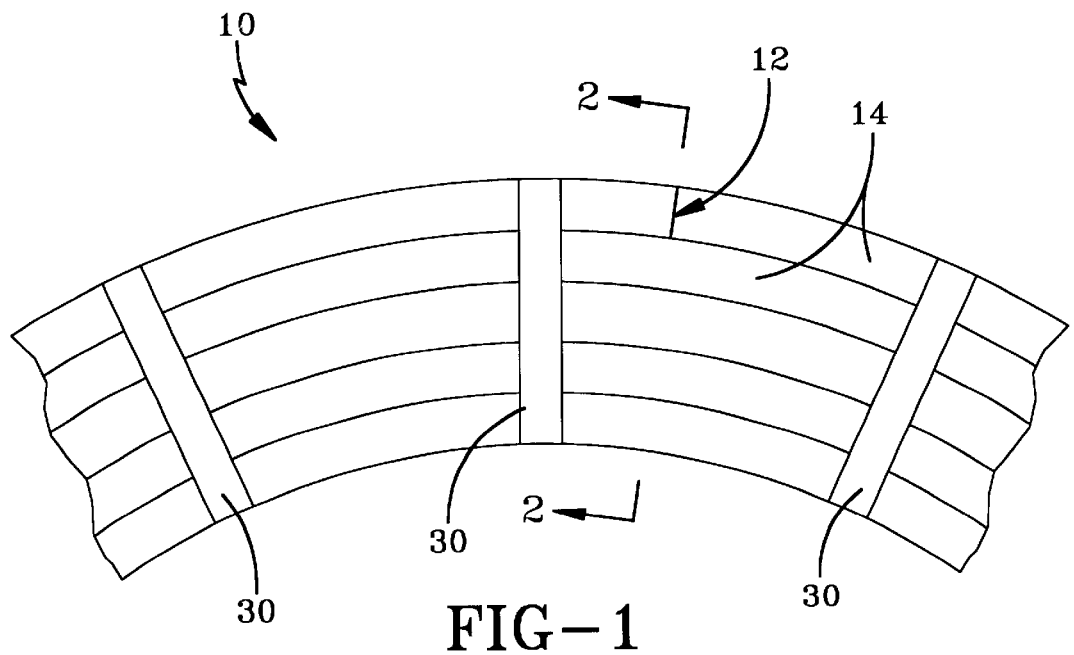
FIG. 1 is a view of a prior art bead wrapped with a nylon cord.
Figure 2:
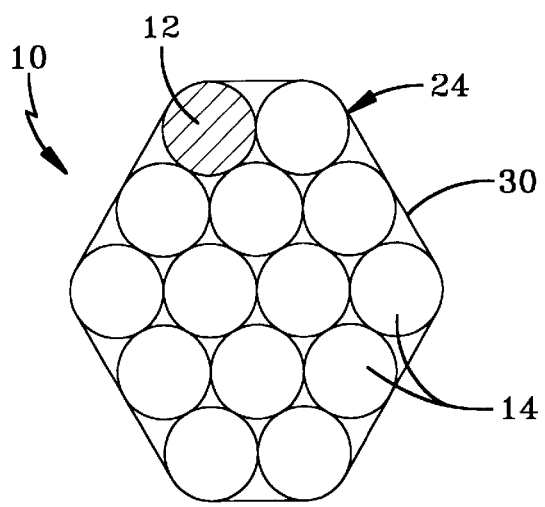
FIG. 2 is a view of the cross-section of the prior art bead taken along line 2—2 in FIG. 1.
Figure 3:
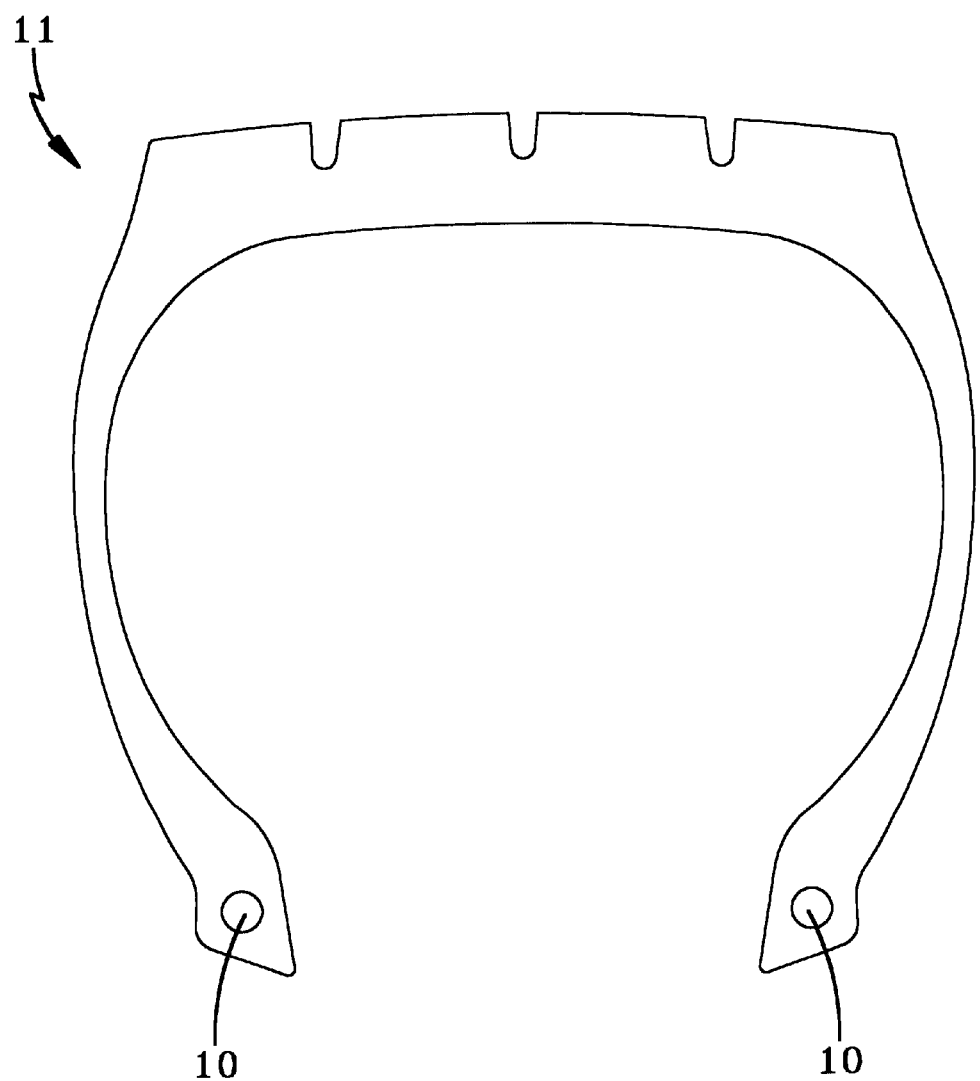
FIG. 3 is a cross-sectional view of a pneumatic tire.
Figure 4:
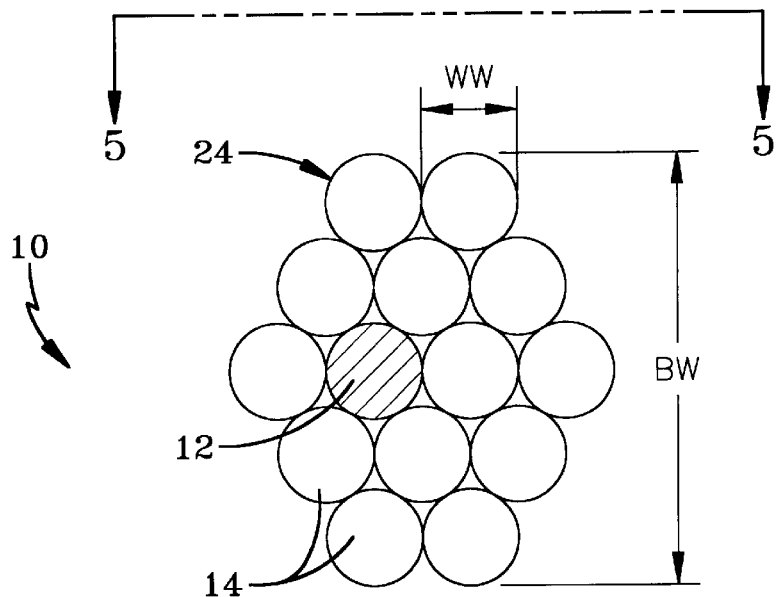
FIG. 4 is a cross-sectional view of a bead formed by the method of the invention.
Figure 6:
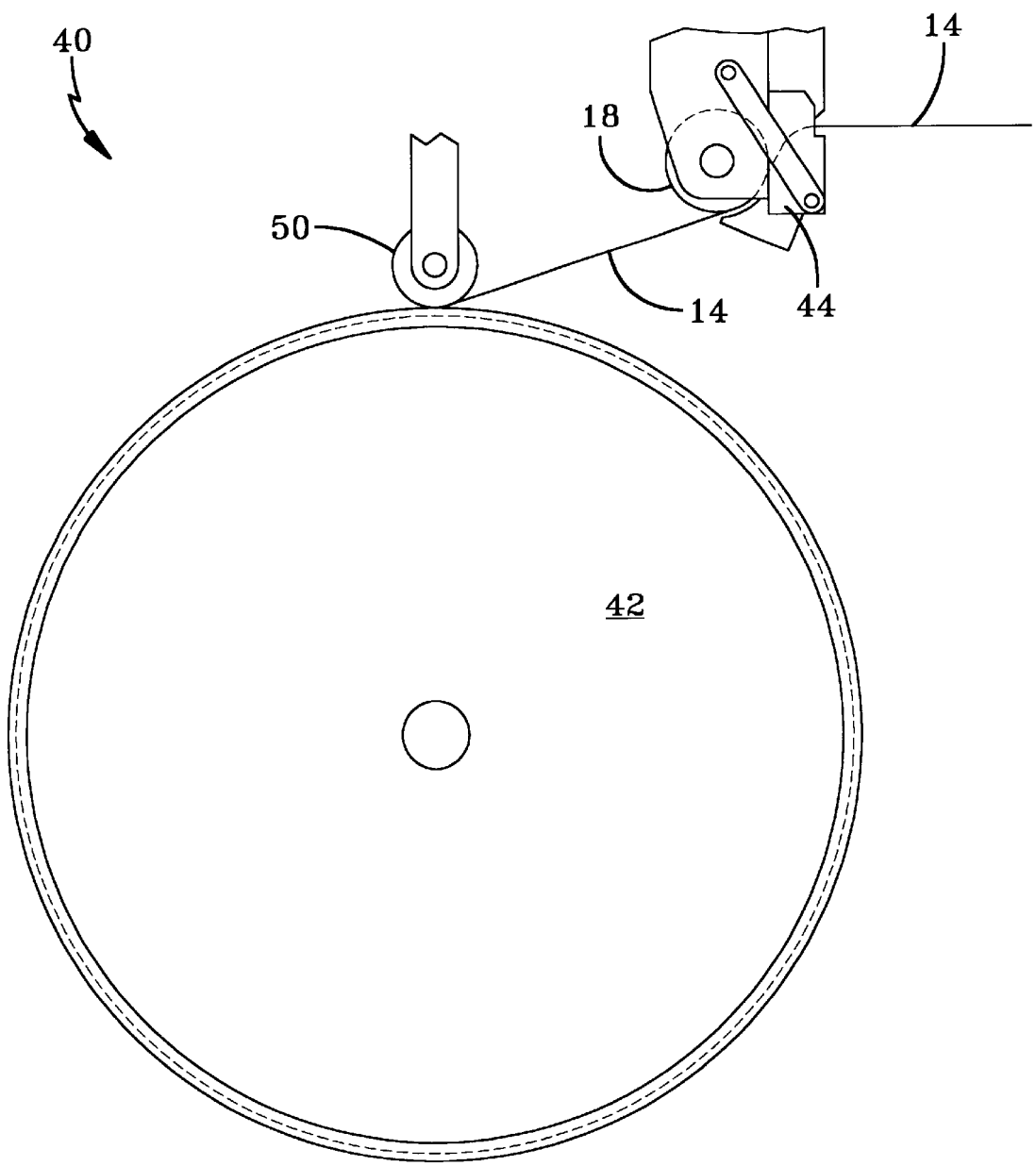
FIG. 6 is a view of a portion of the apparatus that may be used to carry out the method of the invention.

FIG. 3 shows a cross-section of a pneumatic tire 11 with a bead 10 made by the method of the invention. FIG. 4 shows a cross-section of a single wire bead 10 made by the method of the invention. As shown, the trailing end 12 of the bead wire 14 is anchored in the center portion of the bead 10. By anchoring the trailing end 12 of the bead 10, spring back of the trailing end 12 is eliminated. The bead 10 of this invention can be formed on the modified version of the bead crimping and handling system that is disclosed in U.S. Pat. 4,806,196, assigned to The Goodyear Tire & Rubber Company. FIG. 6 shows a portion of this modified bead forming apparatus 40.

A single wire, or monofilament, bead 10 is formed by securing a leading end of the bead wire 14 to an expanded former 42. A former 42 is a collapsible, grooved drum upon which a bead 10 is formed. Typically, a former 42 is designed with a plurality of grooves so that multiple beads 10 can be formed at once. The bead wire 14 is a high strength, relatively non-extensible material that may be covered with a rubber coating or may be rubberless. The bead wire 14 used in the method of the invention may be any size; however, a 0.050" bead wire is preferred.

Once the leading end of the bead wire 14 is secured, the bead wire 14 is wound about the former 42 a plurality of revolutions to form the bead 10 into the desired cross-sectional shape. To form the hexagonal bead shown in FIG. 4, the bead wire 14 is wound around the former 42 fourteen times. A preferred method of winding the bead wire 14 about the former 42 is to rotate the former 42 about a center axis while continuously supplying the bead wire 14.

After completing the last revolution 28 of the former 42, the bead wire 14 is cut to form the trailing end 12. The trailing end 12 of the bead wire 14 is then driven into the bead 10 where it becomes anchored by the previously wound revolutions of the bead wire 14. The driving of the trailing end 12 forces the trailing end 12 between at least two previously wound, abutting revolutions of the bead wire 14, at least temporarily separating the respective revolutions.

Figures 7, 8:
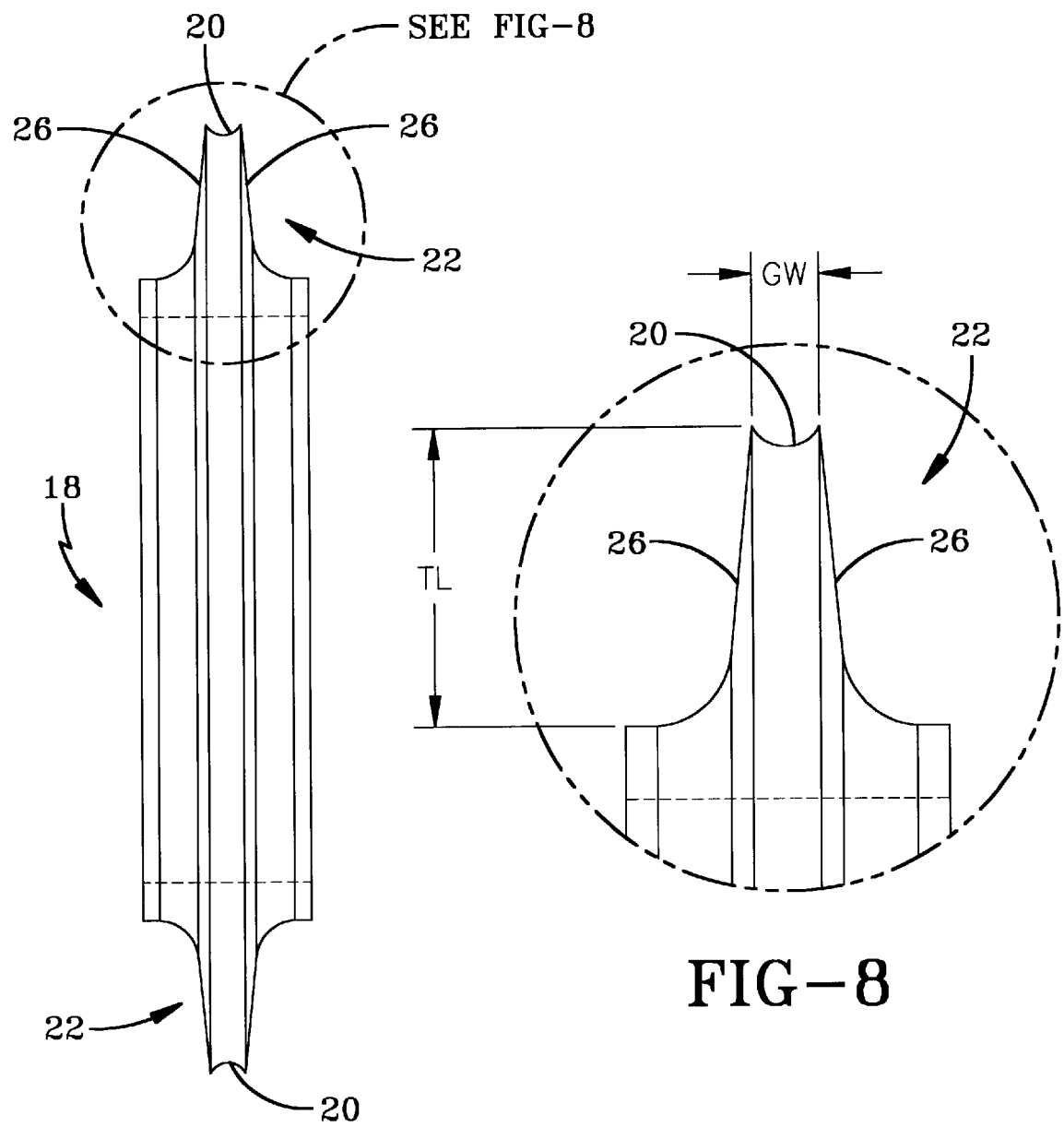
FIG. 7 is a side view of a punch wheel which is part of the apparatus shown in FIG. 6.
FIG. 8 is an exploded view of the tapered edge of the punch shown in FIG. 7.

A mechanism that can be used to drive the trailing end 12 of the bead wire 14 into the bead 10 is depicted in FIG. 7. This punch wheel 18 is circular in shape and is rotatable about a central axis. Extending from the punch wheel 18 around its circumference is a tapered edge 22 which has a grooved tip 20. As seen in FIG. 7 and FIG. 8, the grooved tip 20 of the tapered edge 22 is concave and is sized to hold a portion of the circumference of the bead wire 14. If the bead wire 14 has a width of WW, the grooved tip 20 has a width GW that is less than or equal to the bead wire width WW. Preferably, the grooved tip width GW is in the range of 60% to 90% the bead wire width WW.

FIG. 4 shows the trailing end 12 of the bead wire 14 anchored in a center portion of the bead 10. Although the center portion of the bead is preferred, the trailing end 12 can be anchored at any location in the bead 10 other than the radially outermost row 24.

The method of the invention can be utilized with beads 10 made from a single bead wire or from multiple bead wires. In beads 10 with multiple bead wires, the leading end of the radially outermost bead wire is secured. The radially outermost bead wire is wound about the former 42 a plurality of revolutions to form the desired cross-sectional shape. The bead wire 14 is cut after the last revolution 28 to form the trailing end 12 and the trailing end 12 is anchored by driving it into the bead 10. This method can be used to anchor the trailing end 12 of each bead wire 14 of the multiple wire bead or only the radially outermost bead wire. If each bead wire 14 of a multiple bead wire bead is anchored, it is preferred to alternate the location of the trailing end 12 within the bead 10.

FIG. 6 shows a portion of a bead forming apparatus 40 that can be used for perform the method of the invention. The bead forming apparatus 40 has a former 42, with at least one groove for forming a bead 10, a wire guide 44, a punch wheel 18, and a crimper wheel 50. As the bead wire 14 enters the apparatus 40, it is fed into the wire guide 44. While the bead wire 14 is being supplied, the wire guide 44 is in close contact with the punch wheel 18. The bead wire 14 passes through the wire guide 44 and a portion of its circumference is received in the grooved tip 20 of the punch wheel 18. The punch wheel 18 rotates about its axis as the bead wire 14 is supplied to the former 42. After passing the punch wheel 18, the bead wire 14 travels toward the former 42 where it is received in the groove of the former 42. During the building of the bead 10, the crimper wheel 50 is in close contact with the former 42. The crimper wheel 50 has a groove that may receive a portion of the fully or partially formed bead 10. The crimper wheel 50 applies a pressure to the bead 10 to maintain the desired cross-sectional shape.

After the last revolution 28 of the bead wire 14, the bead wire 14 is cut by a cutting device located near the wire guide 44 prior to the punch wheel 18. When the bead wire 14 is cut, the punch wheel 18 is activated and is driven into the bead 10 on the former 42. When the punch wheel 18 is activated, the wire guide 44 is mechanically moved out of the path of the punch wheel 18 so as to not interfere with the anchoring of the bead 10. The grooved tip 20 of the punch wheel 18 forces the trailing end 12 into the bead 10. The punch wheel 18 continues to rotate as the former 42 rotates. The trailing end 12 of the bead wire 14 passes from the punch wheel 18 and becomes anchored in the bead 10. After the trailing end 12 of the bead wire 14 passed from the punch wheel 18, the punch wheel 18 is removed from the bead 10. The bead 10 continues to rotate on the former 42 until the crimper wheel 50 compresses the bead 10 back into the desired cross-sectional shape. After passing the crimper wheel 50 a final time, the former 42 is stopped and collapsed so that the bead 10 may be removed.

Figure 5:
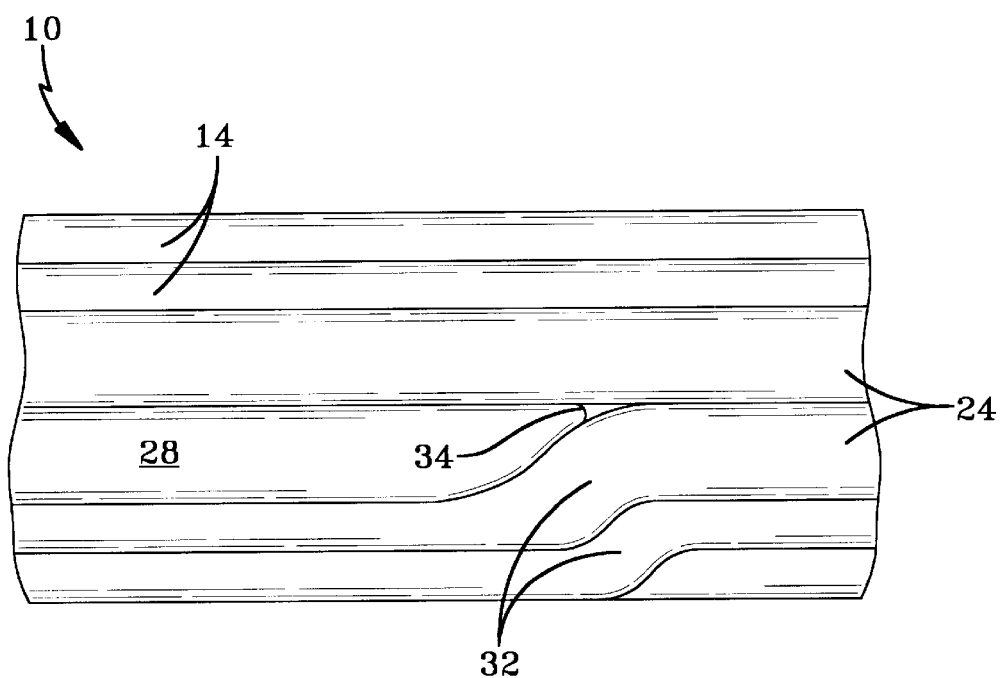
FIG. 5 is a top view of the bead shown in FIG. 4, taken along line 5—5.

The punch wheel 18 works by holding a portion of the circumference of the bead wire 14 and driving the trailing end 12 of the bead wire 14 in between at least two previously wound, abutting revolutions. Ideally, the punch wheel 18 will anchor the last two to four inches (50.8 mm to 101.6 mm) of the bead wire 14. As the punch wheel 18 drives the trailing end 12 between the previously wound, abutting revolutions, the respective revolutions at least temporarily separate. The respective revolutions pass the trailing end 12 and are further separated by the tapered sides 26 of the tapered edge 22. As the punch wheel 18 is removed, these respective revolutions move back into a position surrounding the trailing end 12 of the bead wire 14. In this position, the respective revolutions may again abut one another or may be separated by the trailing end 12. As seen in FIG. 5, the last revolution 28 of the bead wire 14 becomes anchored under the other revolutions. After passing the crimper wheel 50, a slight bend 32 may occur in some of the revolutions near the burial point 34 of the last revolution 28.

In forming the bead 10, additional steps can be taken to ensure that the trailing end 12 is anchored in the center portion of the bead 10. Since the desired cross-sectional shape of the bead 10 is known, the bead width BW can be determined. After determining the bead width BW, the punch wheel 18 can be controlled to drive the tang end 12 of the bead wire 14 into the center portion of the bead 10. Since the radially innermost portion of the bead will rest in the groove of the former 42, using the punch wheel 18 to drive the trailing end 12 of the bead 10 to a distance approximately one-half the bead width BW from the former 42 will place the trailing end 12 in the center portion of the bead 10. In order to perform this task, the tapered edge 22 of the punch wheel 18 must have a length TL of at least one-half of the bead width BW.

A bead 10 made by the method of this invention will have a trailing end 12 that is securely held in place during the curing process, eliminating spring back of the bead wire 14. During curing, as the adhesiveness of the rubber coating on the bead wire 14 lessens, the trailing end 12 is held in place by other revolutions of the bead wire 14.

What is claimed is:

1. A method of forming a bead (10), a trailing end (12) of at least one bead wire (14) being anchored in the bead (10), the method including the steps of:

securing a leading end of the bead wire (14) to bead former (42);

winding the bead wire (14) about bead former (42) a plurality of revolutions to form the bead (10) into a desired cross-sectional shape; and cutting the bead wire (14) after a last revolution (28) about the bead former (42);

the method being characterized by the step of:

associating a punch wheel (18) with a bead former (42) and anchoring the trailing end (12) of the bead wire (14) by driving the trailing end (12) into the bead (10), using punch wheel (18), punch wheel (18) having a tapered edge (22) which has a grooved tip (20), which is used to drive the trailing end (12) between at least two previously wound and abutting revolutions of bead wire (14).

2. A method as in claim 1 being further characterized by the step of:

crimping the bead (10) to ensure the desired cross-sectional shape is maintained.

3. The method of claim 1 further comprising the steps of:

(i) determining a width (BW) of the bead (10); and (ii) driving the trailing end (12) of the bead wire (14) into a central portion of the bead (10).

4. The method of claim 1 which comprises the further step of providing a punch wheel (18) with a grooved tip (20) which is concave and sized to hold a portion of the circumference of the bead wire (14).

* * * * *